E. C. WALTER.
TYPE WRITER.
APPLICATION FILED MAY 3, 1909.
1,056,721.
Patented Mar. 18, 1913.
4 SHEETS—SHEET 2.
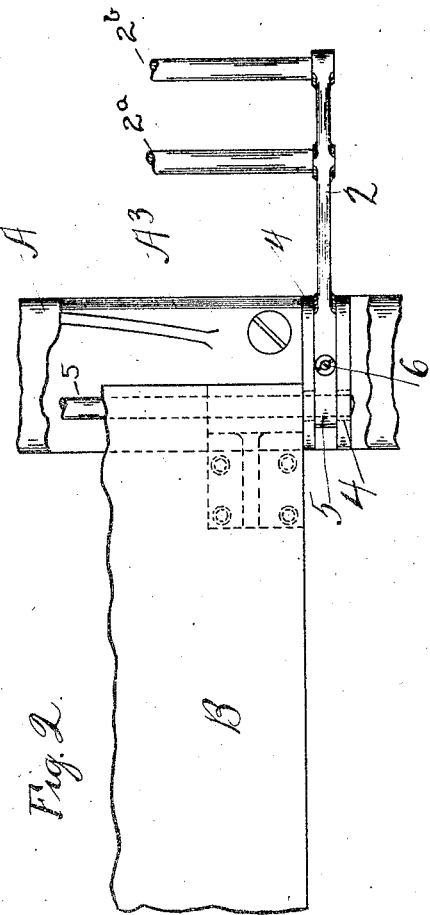
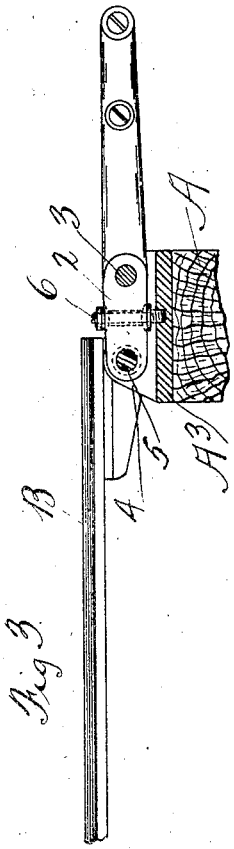
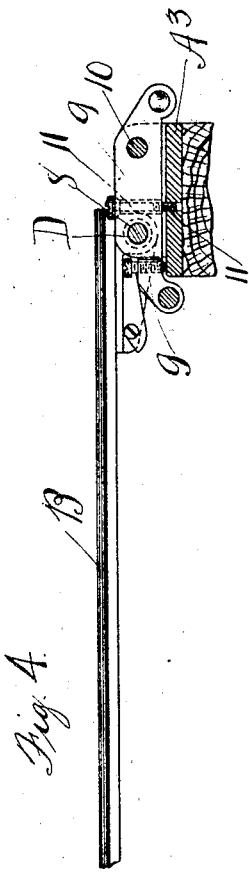
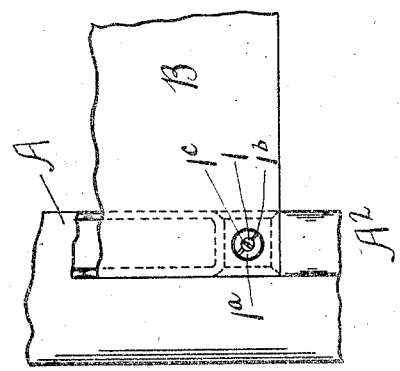
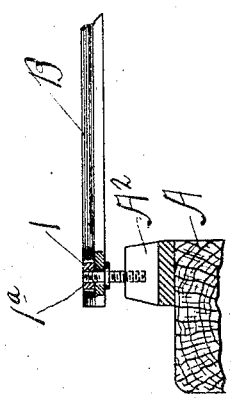
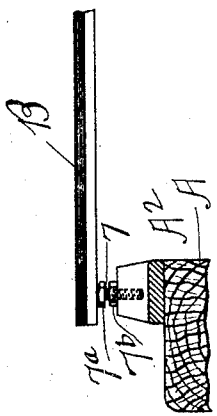
WITNESSES
B. L. Miller
J. M. Copenhaver
INVENTOR
Edward C. Walter
BY
Edmund H. Parry
ATTORNEY

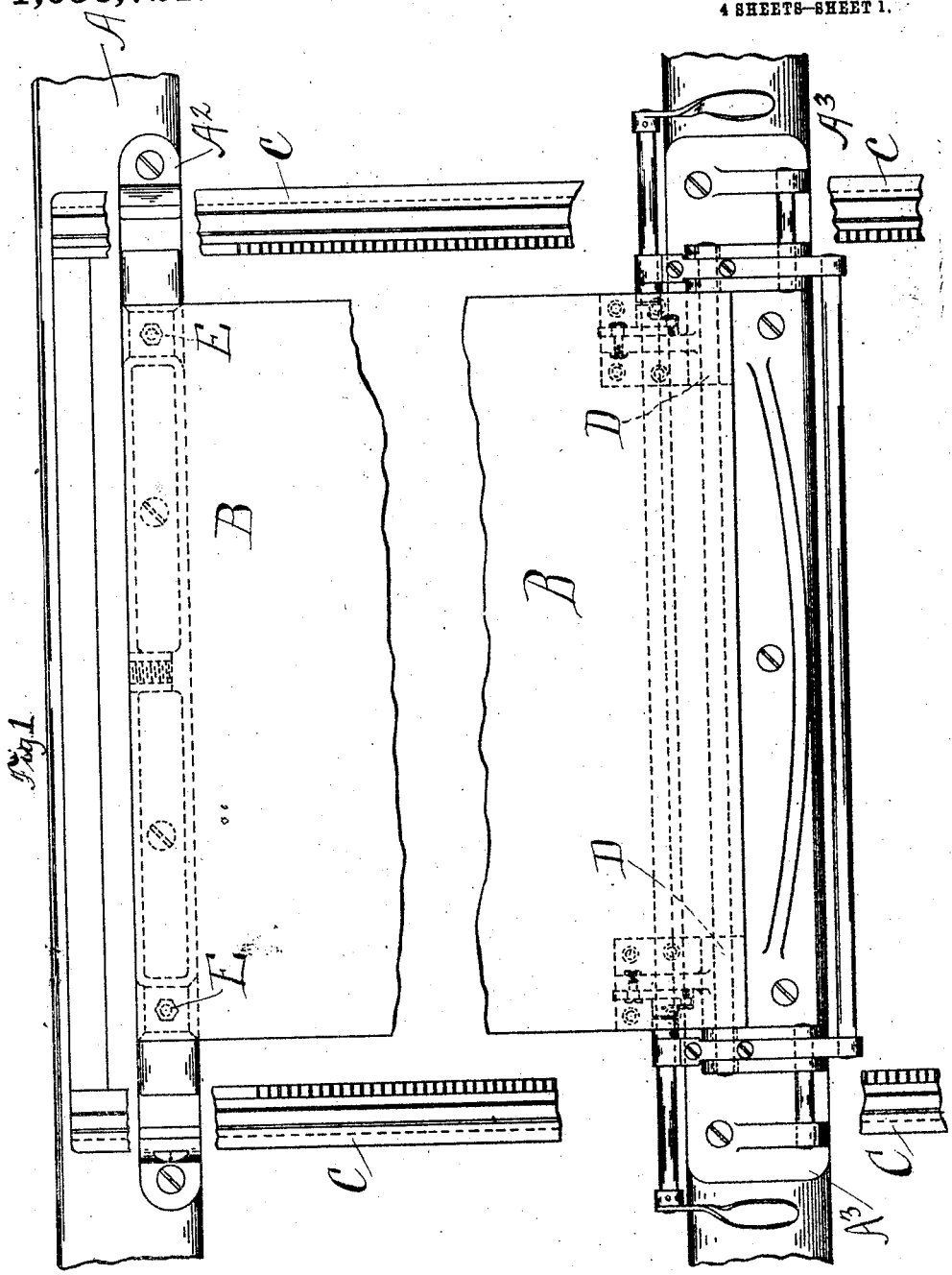

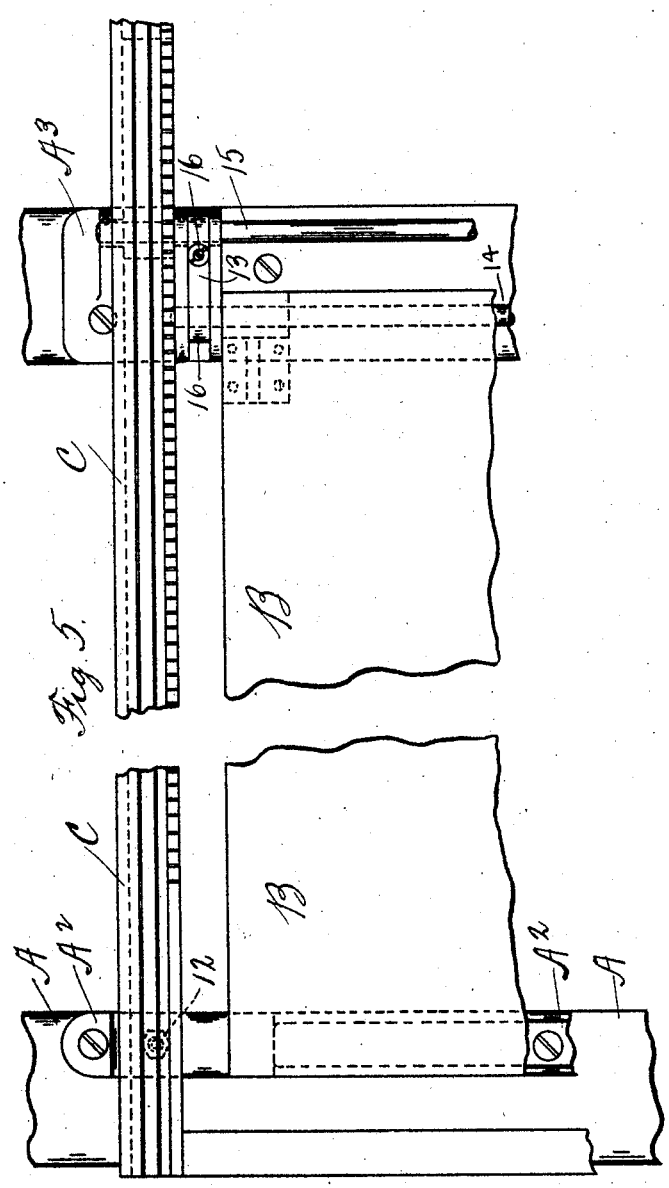
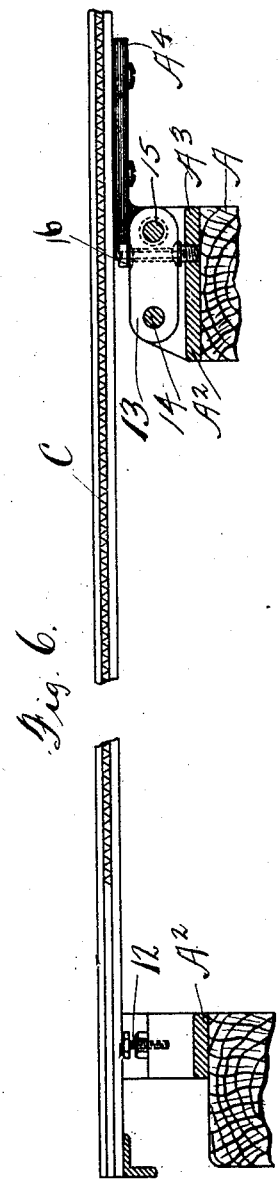

E. C. WALTER.
TYPE WRITER.
APPLICATION FILED MAY 3, 1909.
1,056,721.
Patented Mar. 18, 1913.
4 SHEETS—SHEET 4.
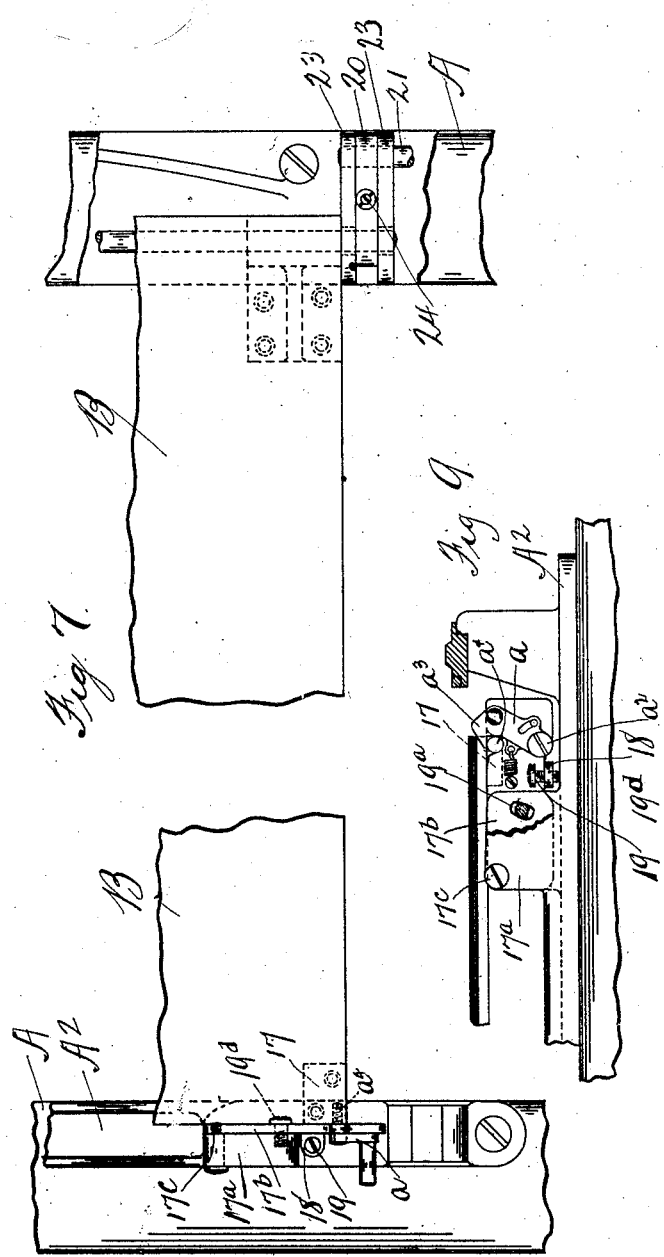
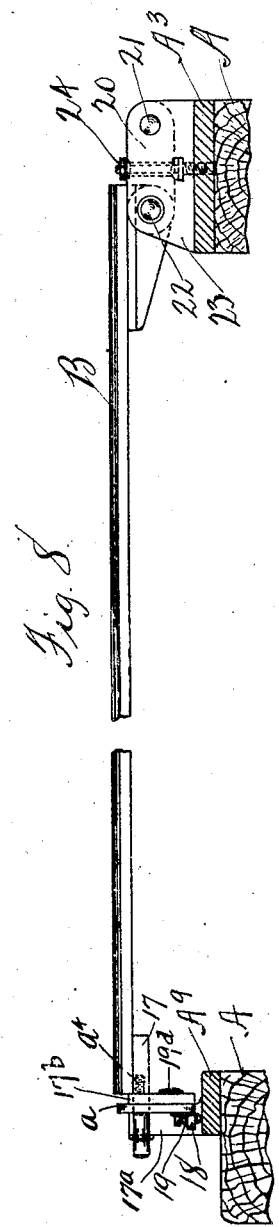
WITNESSES:
B. L. Miller.
J. M. Copenhaver.
INVENTOR
Edward C. Walter,
BY
Edmund H. Parry
ATTORNEY

UNITED STATES PATENT OFFICE.

EDWARD C. WALTER, OF NEW YORK, N. Y., ASSIGNOR TO HARRY T. AMBROSE, OF ORANGE, NEW JERSEY.

TYPE-WRITER.

1,056,721.   Specification of Letters Patent.   Patented Mar. 18, 1913.

Application filed May 3, 1909. Serial No. 493,488.

*To all whom it may concern:*

Be it known that I, EDWARD C. WALTER, a citizen of the United States, residing at New York, in the county of New York and State of New York, have invented certain new and useful Improvements in Type-Writers, of which the following is a specification.

This invention relates to typewriters, and, particularly, to that class known as flat-platen typewriters.

The object of the invention is to effect a relative leveling adjustment between the platen and the tracks or track-frame which supports the traveling printing-mechanism as occasion may require, either when the machine is being assembled in the factory for marketing, or where, in use, it becomes necessary in view of unusual thickness of the work-sheet or sheets.

Another object is to provide for a relative adjustment or leveling, between the tracks and platen after regrinding and "lapping" of the platen and in order to arrange for the proper relative positioning of the writing-mechanism relative to the platen or the relative positioning of platen relative to the writing-mechanism.

The invention has other objects, all as will appear in the detailed description of the structure.

With these objects in view, the invention resides chiefly in providing means operating upon either the platen or the tracks (as the case may be) for effecting an adjustment or positioning of these members relative to each other in order that, for operation of the machine, the writing-surface and the printing-mechanism shall occupy the proper relative planes according to the space necessary or desired between these two elements of a flat-platen typewriter.

The invention resides, further, in means for effecting a relative horizontal adjustment of the planes of parts or positioning between the platen and the track-rails and relative, particularly, to the writing-mechanism, whereby the latter may normally occupy its proper operative position with relation to the writing-surface of the platen.

The invention resides, also, in details of construction and arrangement of parts, all as particularized hereinafter.

In the manufacture of typewriters of the class to which the present invention belongs, it has been found that, in the absence of special means or devices, it is practically impossible to assemble the platen and the machine-traversed tracks exactly true and level relatively; and, as it is essential to achieve this result, and in a simple manner and with simple and effective mechanism, I have devised the invention forming the subject-matter of this case and which, by practical tests, has proved not only to be practicable but valuable, and, also, to render unnecessary the uncertain methods, heretofore practiced, of "truing up" the tracks and platen in order that they might be made to occupy proper relative positions. Likewise, where, by extensive and long use, the platen has become worn, and it has become necessary to regrind its operative surface, it has been found that such regrinding has increased the distance between the writing-surface of the platen and the writing-mechanism, so that, in printing, the type-bar would not strike "true", because of the fact that its arc of movement has been increased—not to a large degree but sufficiently, nevertheless, to preclude properly alined and positioned impressions of the type-character on the work-sheet. Furthermore, in the varied use of the machine, it has been found that the increased thickness of the work-sheet or sheets—especially where manifolding is being effected with a great number of carbon-elements interleafed between the several work-sheets—decreases the arc of movement or travel of the typebar to an extent that it reaches its imprinting position before the type-character has become positioned to strike accurately and in true alinement. On a limited number of sheets, this is not noticeable. The invention is applicable to a large number of sheets. It will be seen, therefore, that the provision of means for changing the relative positions of the platen and the tracks and writing-mechanism, to meet any of these exigencies, presents a valuable adjunct to the machine. Consequently, my invention contemplates, in its broadest aspect, such means, which may operate to adjust the platen relative to the machine-traversed rails or tracks; or to adjust such tracks relative to the platen; or to adjust both the platen and the tracks; or to adjust the supporting surfaces of the base or bases which sustains or sustain these members; or to change the position of the printing mechanism on its supporting carriage relative to the writing surface—in each and all of these instances to achieve the function of changing the positions of the writing-mechanism and printing surface relatively in their horizontal plane.

In the accompanying drawings, in which like letters of reference indicate corresponding parts, and wherein I have illustrated but two of the many obvious embodiments of my invention (it being apparent that, under the broad and dominating aspect of my invention, various other embodiments may be utilized and be within the spirit of my invention): Figure 1 is a view in plan, showing a tiltable flat platen and machine-traversed rails connected to constitute a frame, and embodying the form of means employed to adjust the platen; Fig. 2 is a fragmentary view, in plan, of a non-tiltable or billing-platen, (the tracks being omitted merely to avoid any obscuring of the parts), and showing the platen-adjusting means; Fig. 3 is a view in side elevation, partly in section, of the structure illustrated in Fig. 2; Fig. 4 is a similar view, but showing the platen-adjusting means in connection with a tiltable platen employed in connection with book-typewriters, so-called in the art; Fig. 5 is a fragmentary view, in plan, of the platen and a tiltable track, and, in this instance, showing the adjusting-means applied to the track; Fig. 6 is a view in side elevation thereof, partly in section; Fig. 7 is a fragmentary view in plan, showing a modified form of platen adjusting-means; Fig. 8 is a view in side elevation of the structure illustrated in Fig. 7; Fig. 9 is a view in front elevation.

In these drawings, and throughout the several views, A designates the base of the machine; B the platen supported thereon; C the tracks or track-frame also supported thereon; D the platen-hinge; and E the adjusting-means, generally, the details of which will now be described.

In its simplest form, the adjusting device comprises an adjusting-member which may, and usually is, in the form of a screw of any appropriate style and size and which engages directly with or into the member (the platen or track) to be adjusted, or with or into some part carried thereby or connected therewith. It is to be understood that these adjusting-screws may be disposed at each of the corners of the member (Fig. 1) or at any desired position; also, that the adjustment may be effected otherwise than by the screw, as by a lever or arm; and, also by means operating simultaneously and interdependently at the various portions of the member, or operating at one or more portions thereof independently.

In Figs. 2 and 3, a two-stem adjusting screw 1 is shown as extending upwardly through the forward end of the platen B and threaded into the front-plate $A^2$ secured to the base A. This screw 1 carries at its upper screw-threaded portion a nut $1^a$ provided with a two-part cut $1^b$, and the upper end of the screw 1 is also provided with a cut $1^c$. This construction permits the screw to be turned, and the nut to be tightened.

At the rear of the platen is secured an arm 2 pivoted at 3 on the bracket 4, constituting a part of back-plate $A^3$ and connecting with the platen at 5 which is a shaft upon which the platen fulcrums and which therefore permits it to be tilted. As shown, the arm 2 supports two transverse shafts or rods $2^a$ and $2^b$. Extending through the arm 2 is an adjusting-screw 6 which is threaded into the back-plate $A^3$. This screw 6 has a long screw-threaded upper stem, a circumferential flange (the upper face of which is curved to take into a bowl-shaped recess in the lower face of said arm 2), and a short lower screw-threaded portion which engages in screw-threads in the back-plate $A^3$, as shown in Fig. 3. Said upper screw-threaded stem carries a locking-nut and an underlying washer which encircles the stem and its central opening being of diameter larger than the diameter of said stem to permit a certain amount of play during adjustments. Said washer is seated in a bowl-shaped depression in the upper edge of the arm 2. By this arrangement the screw 2 may be turned and then the nut tightened to effect a locking. This form of screw appears also in the forms of structure illustrated in Figs. 2, 3, 5, 6, 7 and 8, and the description here will suffice to make clear what the form of rear-adjusting means is. It will be understood that the turning of the screw 6 will cause the arm 2 to be actuated on its pivot 3, and, the arm acting, in this instance, as a lever of the second order, causes the rear end of the platen with which it connects through the shelf 5, to rise or fall, according to the direction in which the screw 6 is turned. The turning of the screw 1 at the front (there being one at each side, as shown in Fig. 1) raises or lowers that end. It is apparent that to effect a leveling of the platen, only one or more of the screws will have to be turned, whereas, if a repositioning of the platen is desired, the screws at the various corners will have to be turned.

In Fig. 4, where the platen is shown as tiltable by reason of being hinged at D at the rear, the arrangement is preferably somewhat different: In this instance, the front-adjusting screw 7 does not project upwardly into the platen, but, on the contrary, has a head $7^a$ upon which the platen B normally rests and from which it is free to be tilted upward. The screw-stem may be threaded into a locking nut $7^b$ which is in engagement with the upper surface of the front-plate $A^2$ to prevent the screw $7^b$ from shifting and into which the screw-stem penetrates, as clearly shown in Fig. 4. In the rear, the platen has pivoted to it at 8 a short-arm 9 fulcrumed at 10. An adjusting-screw 11 (of the kind already specifically described) extends through the arm 9 and into the back-plate $A^3$. The turning of the screw 11 actuates the arm 9 on its fulcrum to lower the rear end of the platen. To effect a raising of the arm 9, another headed screw $11^a$ extends through the forward portion arm, in advance of its fulcrum 8, and bears against the upper face of the back-plate. The adjusting of this screw elevates the forward portion of the arm 9 and raises the platen,—the screw 11 being unscrewed slightly to permit this. To adjust screw 11, the screw must be unscrewed. The arrangement is such that the platen is free to be tilted upward on its hinge without affecting the adjusting-device.

In some instances, I may desire to adjust the track C in lieu of adjusting the platen, in the manner already described; and, to this end, I provide the construction illustrated in Figs. 5 and 6, wherein a front adjusting-screw 12 (of construction similar to, and operating similarly to, that used in the platen-adjusting device shown in Fig. 4) is provided to extend into an upstanding portion of the front-plate $A^2$ and upon the head of which screw the front portion of the rail C rests. At the rear, an arm 13, is fulcrumed on a shaft 14 supported in an upstanding portion of the back-plate $A^3$, and pivoted on the shaft 15 to the track-hinge $A^4$.

As shown in Fig. 5, the platen is mounted on the shaft 14 and fulcrums thereon for a tilting movement. A screw 16 extends vertically through the arm 13 and is threaded into the plate $A^3$. It will be understood that the turning of the screw 16 will actuate the arm 13 on its fulcrum 14 to elevate or lower the opposite end of the arm and, in consequence, the rear portion of the track is elevated or lowered. The arrangement of the parts is such that the adjusting-device is not disturbed when the rail C is tilted.

In some instances, it is not always possible to have the adjusting-screw operate directly on the platen at the front. Therefore, I have devised a modification, as illustrated in Figs. 7-9, wherein the platen is provided in this instance with a projection 17. The front plate $A^2$ is provided with an upright portion $17^a$ to which is pivoted an adjustable plate $17^b$ pivoted at $17^c$ and slotted at $19^a$ to receive the plate-locking screw $19^d$, and is provided with a boss or projection 18 through which extends an adjusting-screw 19 that works on the upper face of the front-plate $A^2$. The turning of the screw 19 elevates the forward end of the platen. After the plate $17^b$ is adjusted (to adjust the platen) the locking screw $19^d$ is tightened to lock the platen in its adjusted position. To adjust the rear end thereof, I provide at the rear an arm 20 fulcrumed on shaft 21 and pivoted at 22 to the platen B. The arm 20 is disposed between the two upstanding cheeks 23, 23, forming a trunnion. An adjusting-screw 24 extends through the arm 20 and is threaded into the back-plate $A^3$ so that when said screw is turned, it actuates said arm 20 and raises or lowers the rear end of the platen, the bore of the hole in the cheeks 23 being larger than the diameter of the axle 22 (as shown in dotted lines in Fig. 7, and in full lines in Fig. 8) to permit a certain amount of play, that is, of the axle in said bore in the cheeks, such play being as great as the limit of adjustment. The plate $a$, pivoted at $a^2$, has a hook-end $a^3$ designed to engage with a stud $a^4$ carried by block 17. This serves as a platen-lock.

It will now be seen that I have herein presented a construction whereby the platen or the tracks may be adjusted at the front or at the rear, or both ends; that, by such construction, the setting up or leveling of the platen or tracks may readily be accomplished whenever this is necessary; that such adjustment of the platen or tracks can be effected without disturbing the adjustment of any of the other parts of the machine, such as the escapement-mechanisms, carriage-steady-rolls, etc.; and that where it is necessary to change the relative position between the writing-mechanism and the writing-surface, this can be accomplished with facility and certainty, so that it becomes a matter of no moment how thick may be the work-sheets, etc., sustained by the platen.

Having thus described my invention, what I claim and desire to secure by Letters Patent is:

1. In a typewriter, a work-sheet support, a printing-mechanism, a printing-mechanism support arranged in juxtaposition to said first-mentioned support, means for sustaining said supporting-elements independently of each other, and means for effecting a vertical adjustment of one of said elements toward and away from said sustaining means whereby to position the element in a horizontal plane relatively different from that of said other element.

2. In a typewriter, a work-sheet support, printing-mechanism traveling thereover, supporting-tracks which said printing-mechanism traverses and occupying a horizontal plane different from that occupied by said sheet-support, a base upon which said sheet-support and tracks are independently supported, and means mounted on said base and operating in a vertical direction on one of said supporting-elements independently of the other of said supporting-elements to effect a change of position thereof with relation to the supporting-element unaffected by said means.

3. In a typewriter, a flat-platen member, rail-members occupying a position entirely free from the edges of said platen-member, a base for supporting said rail-members in the specified independent relation to said platen-member, and vertically-operating means carried by said base and coacting with one of said members independently of the other of said members for changing the normal position of said member to a different relative position.

4. In a typewriter including as elements a flat-platen and track-rails occupying a horizontal position entirely free from the edges of said platen, a base upon which said platen and track-rails are independently supported, and means carried by said base and operating upon one of said specified elements independently of the other for changing its horizontal plane relatively to the other of the elements.

5. In a typewriter including as elements a flat-platen and tracks occupying a position independent of the edges of said platen, a base upon which said platen and tracks are independently supported, and means carried by said base for adjusting one of said elements vertically to change the horizontal relations between said elements in the event that one of said elements is out of proper operative relation to the other.

6. In a typewriter including as elements a flat-platen and tracks arranged independent of the edges thereof, a base upon which said platen and tracks are independently supported, and manually-operated means carried by the base for vertically adjusting one of said elements at one or a plurality of points relatively to the other.

7. In a flat-platen typewriter including as elements a tiltable platen and tracks arranged independent of the edges thereof, a base upon which said platen and tracks are independently supported, and adjusting means carried by said base independently of one of said elements and operating on the other of said elements to adjust it vertically relatively to said other element without disturbing the tilting connection of said platen.

8. In a typewriter including as elements a flat-platen and tiltable tracks arranged independent of the side edges thereof, a base upon which said platen and tracks are independently supported, and adjusting means carried by said base and operating upon one of said elements only to effect a vertical adjustment thereof without disturbing the tilting connection of said tracks.

9. In a flat-platen typewriter including as elements a flat-platen and tracks disposed in a plane independent of the side edges of said platen, a base upon which said platen and tracks are independently supported, and adjusting means engaging said base and operable at a plurality of points on one of said elements to effect a change of its position at one or more points with relation to the other of said elements.

10. In a typewriter, a work-sheet support, a printing-mechanism support arranged in juxtaposition to said first-mentioned support, means for sustaining said supporting-elements independently of each other, means for adjusting one of said elements toward and away from said sustaining means whereby to position the element in a horizontal plane relatively different from that of said other element, and a device for locking said adjusting means to hold the adjusted element in position.

11. In a typewriter including as elements a flat-platen, and track-rails occupying a horizontal position entirely free from the edges thereof, a base upon which said platen and track-rails are independently supported, means carried by said base and operating upon one of the said specified elements independently of the other for changing its horizonal plane relatively to said other element, and a locking-device connecting with said position-changing means for locking the element in its adjusted position.

12. In a typewriter including as elements a flat-platen, and track-rails arranged in juxtaposition thereto, a base upon which said platen and track-rails are supported, an adjusting device including an arm carried by said base and operating upon one of said specified elements independently of the other element for changing its horizontal plane relatively to said other element, and supporting means carried by said arm and movable therewith under the influence of said adjusting device.

In testimony whereof I hereunto affix my signature in presence of two witnesses.

EDWARD C. WALTER.

Witnesses:
W. L. BILLMYER,
CHAS. P. BATT.